Sept. 8, 1964 V. L. FRAZIER 3,147,963
EQUALIZER BUSHING

Filed Dec. 12, 1961 2 Sheets-Sheet 1

INVENTOR.
VAN L. FRAZIER
BY
ATTORNEYS

Sept. 8, 1964     V. L. FRAZIER     3,147,963
EQUALIZER BUSHING

Filed Dec. 12, 1961     2 Sheets-Sheet 2

INVENTOR.
VAN L. FRAZIER
BY Ely, Frye & Hamilton

ATTORNEYS

United States Patent Office 3,147,963
Patented Sept. 8, 1964

3,147,963
EQUALIZER BUSHING
Van L. Frazier, Dayton, Ohio, assignor to The Dayton Steel Foundry Company, Dayton, Ohio, a corporation of Ohio
Filed Dec. 12, 1961, Ser. No. 158,792
4 Claims. (Cl. 267—30)

The present invention relates to resilient bushings and more particularly to a bushing for mounting a tandem spring equalizer.

Suspension systems for tandem axles have been developed which distribute the load carried by each axle. These systems employ tandem springs on each side of the vehicle with the forward axle mounted on the medial portion of each of the forward springs and the rear axle on the medial portion of each of the rear springs. The adjacent ends of the tandem springs are connected by an equalizing means which may comprise a walking beam in which the ends of the spring are retained.

The equalizer or walking beam is pivotally supported from the frame of the vehicle medially of the forward and rear axles. Thus, when a load is impressed on one of the axles, the spring supporting that axle causes the equalizer to rotate with the applied force, thereby impressing a part of the load onto the other spring, as is well known from the prior art.

The journaling of the equalizer onto its support presents various difficulties. Although the equalizer does not ever fully rotate, the continuous rocking oscillation makes metal-to-metal contact impractical without constant lubrication, which is also highly impractical considering the constant exposure of the equalizer bearing to weather and road conditions as well as the uncertainty of periodic lubrication incident to trailer exchange and long distance hauling.

As an improvement over metal-to-metal journals various configurations of resilient bushings have been proposed. The resilient bushings utilized have generally been of two types, compression or torselastic. A compression bushing is formed by packing or stuffing a resilient material into the journal. The packing is retained by a restricting means such as a washer which deforms the material to press against the supporting member and the rockable equalizer in proportion to the pressure exerted against the bushing by the retaining means. The uncertain and varying pressure thus exerted can easily result in the resilient bushing being too loose or too tight. If the bushing is too loose, the equalizer will shift transversely on its journaled support and impart an impact shock to the vehicle every time the wheels encounter an irregularity in the road surface. Furthermore, if the bushing is too loose, it will turn with respect to the equalizer or pin as the equalizer oscillates and thereby prematurely wear the bushing. If the bushing is too tight, it will frictionally engage the relatively rotatable members of the journal too firmly. As long as the relatively rotatable members are rotated through a very small arc the torque will flex the bushing without incident. However, when the bushing is too firmly positioned it will shear or rupture as the rotational arc demanded of the equalizer is increased.

The torselastic type bushing comprises a suitably shaped mass of resilient material, usually cylindrical in shape, incorporating or having embedded therein a rigid liner for improving dimensional stability and load-bearing properties. The torselastic type bushing is generally constructed so as to engage both the relatively rotatable member frictionally without the application of exterior distortive force, and is often bonded to one or the other of the members. However, when the torselastic bushing is bonded to one or the other of the relatively rotatable members, shearing or rupturing results.

In general, prior art constructions of torselastic type bushings embody two distinctive disadvantages. First, they are difficult to install, and second, they do not provide full surface contact with both members of the journal when subjected to a load.

To provide the necessary pressure against the relatively rotatable members without the application of an external distortional force, it is mandatory that the bushing be made oversize. Consequently, it is extremely difficult to assemble the journals in which they are used without scoring or abrading the resilient material of the bushing.

If a liner of rigid material is used to restrict the inner or outer dimension of the bushing for effecting easy assembly, the resilient material correspondingly does not supply the required pressure against the relatively rotatable members of the journal and does not properly flow so as to maintain contact with the total surface area of the journal members when a heavy load bears on the journal.

It is therefore an object of the present invention to provide an improved resilient bushing of the torselastic type adapted to be interposed in bearing relation between an oscillatable member, or rockable equalizer, and its relatively fixed supporting member and which has a rigid liner or core adapted to permit the resilient material to flow plastically therethrough at selected locations in order to provide easy assembly of the journal bearing in which it is mounted and to provide continuous firm, but not restrictive, pressure against the relatively rotatable members of the journal.

It is a further object of the present invention to provide a resilient bushing as described above which is not bonded to either of the relatively rotatable members of the journal and which provides firm pressure thereagainst without retaining means exerting a deforming pressure against the bushing itself.

It is a still further object of the present invention to provide a resilient bushing as described above which will provide a firm cushion therebetween and yet will not internally shear or rupture.

These and other objects of the invention, and further advantages hereof, will become apparent in the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Referring to the drawings.

In general, a torselastic bushing according to the invention comprises an elongate cylinder of resilient material which has a longitudinal coaxial bore extending therethrough. Embedded in the resilient material, and also coaxial therewith is a liner, core or rigid baffle sleeve. The baffle sleeve is a preferably cylindrical shell with transverse passages at spaced intervals to permit a controlled plastic flow of the resilient material therethrough in response to pressures or stresses imparted transversely to the rotational axes of the journal. The control of the plastic flow of the resilient material by the baffle sleeve accomplishes at least two important results. First, a journal utilizing the bushing may be easily assembled and second, the bushing will maintain frictionally full surface contact with both the relatively rotatable members of the journal at all times. A bearing utilizing this bushing is thereby adequately cushioned against sudden shifts in the direction of the imparted load. Moreover, the bushing engages the bearing with sufficient friction to flex with the equalizer as it oscillates through its normal range, and yet will slip when the equalizer rocks through an angular range which would otherwise rupture or shear the flexible material.

Figure 1:
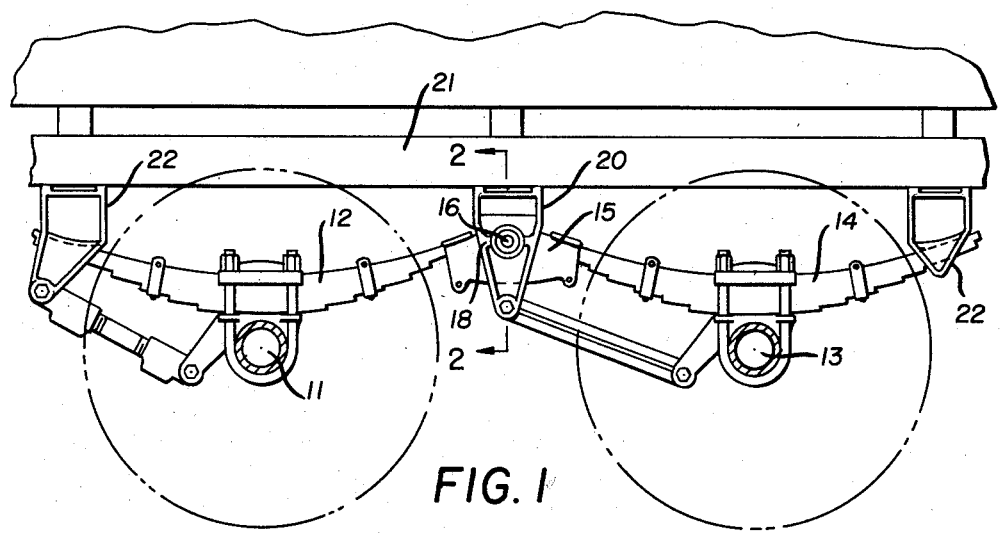
FIG. 1 is a side elevation of a tandem spring arrangement for supporting tandem axles with the adjacent ends of the tandem springs interconnected by an equalizer.
Figures 2, 3:
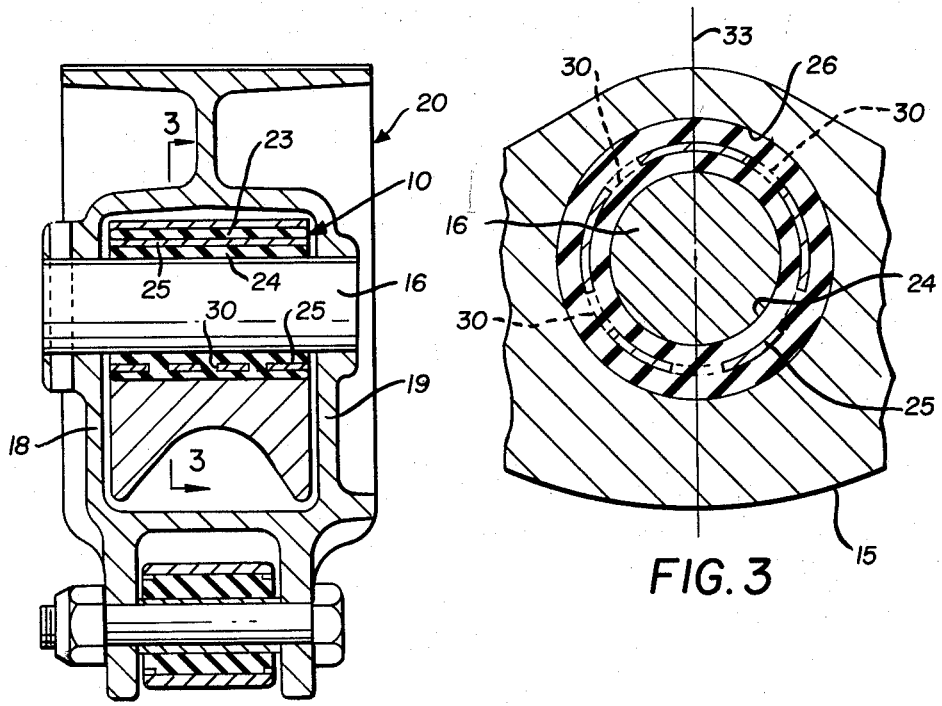
FIG. 2 is an enlarged cross sectional view taken substantially on line 2—2 of FIG. 1 depicting a bushing according to the present invention positioned in the journal bearing between the equalizer and the pin on which it is mounted.
FIG. 3 is an enlarged side sectional view taken substantially on line 3—3 of FIG. 2.

The improved resilient equalizer bushing, indicated generally by the numeral 10, is embodied within the equalized tandem suspension system of the type depicted in FIG. 1. In an equalized tandem suspension, tandem leaf springs are positioned on each side of the vehicles. The forward axle 11 is mounted to the medial portion of the forward springs 12 and the rear axle 13 is mounted to the medial portion of the rear springs 14. The adjacent ends of the springs 12 and 14 are received in an oscillatable member or equalizer 15 which is adapted to pivotally rotate or oscillate about relatively fixed supporting member or equalizer supporting pin 16. Pin 16 extends between the side plates 18 and 19 of an equalizer bracket 20 which is secured, as by welding, to the longitudinal frame member 21 of a vehicle.

The opposite ends of the springs 12 ad 14 are received in hanger brackets 22 which are also secured to the longitudinal frame member 21. By this arrangement the upward thrust of either axle deflects the spring on which it is mounted and causes the equalizer to rotate therewith, thus impressing a portion of the load on to the other axle.

The bushing 10 between equalizer 15 and pin 16 comprises an elongate cylinder 23 of resilient material which has a bore 24 extending coaxially therethrough, and a rigid, preferably steel, baffle sleeve 25 embedded therein.

The resilient material embodied in the bushing 10 according to the invention may be any suitable material inherently possessing the properties of high tensile strength, vibration dampening characteristics, load bearing strength and relatively low coefficient of friction could be employed. For example, a natural rubber stock cured to have a hardness Shore A, of 60 to 70 could be used. Alternatively, a gum urethane stock, compounded and cured like conventional rubber, or with suitable chemical curing agents, could also be used.

The outer diameter of the bushing 10, when the bushing is inserted within the equalizer 15 is such as to frictionally engage substantially the entire surface of the journal bore 26 through equalizer 15. To provide a yielding mass of resilient material which will frictionally engage the bore 26 without sacrifice of the bearing properties of the bushing 10, the outer surface of the bushing 10 is specially contoured.

Figure 6:
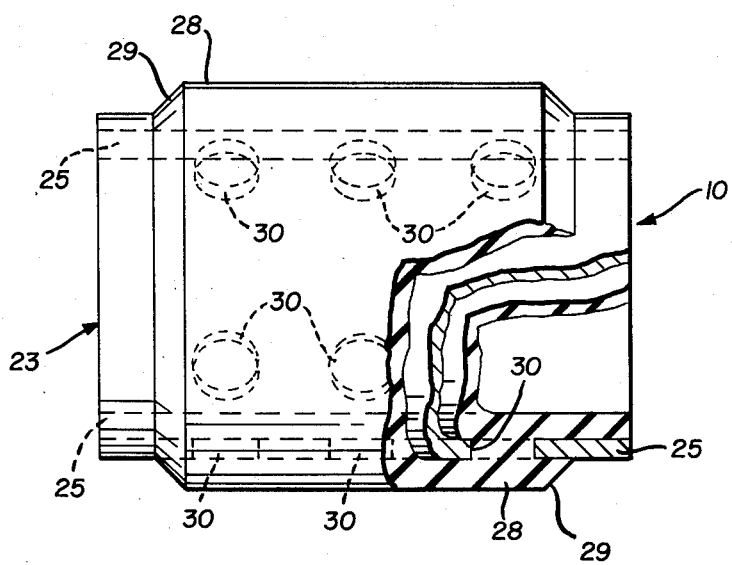
FIG. 6 is a side elevation partly broken away of a resilient bushing according to the present invention.

Referring to FIG. 6, which shows the bushing in the unstressed or non-installed condition, the resilient material adjacent the ends of the cylinder defined by bushing 10 may be relieved or reduced so as to have an outer diameter less than the inner diameter of journal bore 26. The medial portion 28 of the resilient material has an outer diameter larger than the inner diameter of bore 26. Thus, when the bushing 10 is installed within the journal bore 26 the resilient material will plastically flow axially toward the ends of the bushing and fill the relieved portion so that the resilient material will provide substantially full surface contact with the interior surface of journal bore 26 along the length of bushing 10.

The exact configuration established by the outer surface of bushing 10 may vary somewhat, for example, the surfaces 29 may be sharply inclined as is depicted in FIG. 6 with the medial portion 28 having substantial axial length, or surfaces 29 may be more gradually inclined with a medial portion 28 of corresponding lengths. In any event, there must be sufficient resilient material outwardly of the baffle sleeve to engage substantially the entire inner surface of journal bore 26 when the bushing 10 is installed therein.

In addition to the plastic flow of the resilient material axially along baffle sleeve 25, means are provided to permit plastic flow transversely through the sleeve 25. Passages or bores 30 are provided transversely through sleeve 25 in sufficient number and of sufficient area to facilitate the assembly of the journal and also to permit the resilient material of the bushing 10 to maintain full surface contact with both relatively rotatable members even under conditions of severe dynamic loading.

Figure 4:
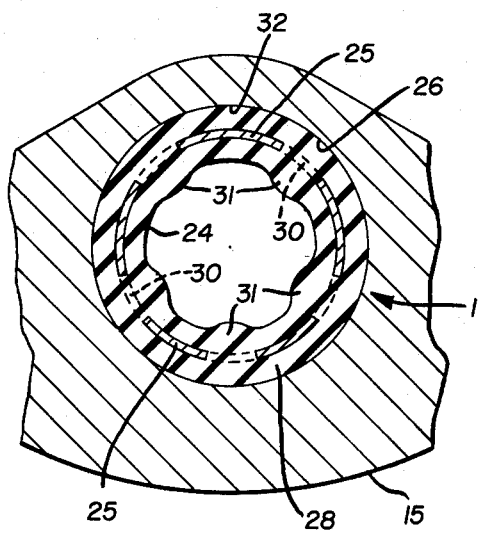
FIG. 4 is a view similar to FIG. 3 showing the bushing positioned within the equalizer and that assembly removed from the supporting shaft.

The diameter of bore 24 to cylinder 23 in the non-installed condition depicted by FIG. 6 is substantially equal to the outer diameter of the equalizer supporting pin 16. After the bushing 10 has been installed within the journal bore 26 of equalizer 15, as shown in FIG. 4, not only has the material flowed to fill the relieved portions radially outwardly of the sleeve 25, but a portion of the resilient material outwardly of the sleeve flows through the passages 30 causing a protuberation of the resilient material radially inwardly of the inner diameter of bore 24 in protuberances 31 at each passage 30. To insert the pin 16 is through bore 24 pin 16 need only be forced past protuberances 31.

Figure 5:
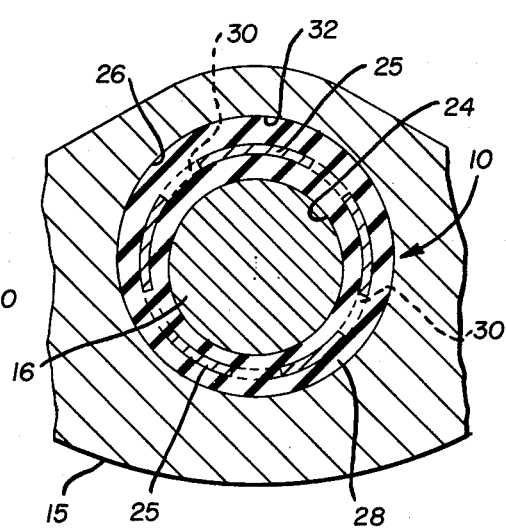
FIG. 5 is a view similar to FIG. 3 showing the distribution of the resilient material in the bushing when a severe load is applied through the equalizer.

The area, number, and position of sufficient passages 30 must be such that the radially outward compression of protuberances 31 when the pin 16 is inserted through bore 24 causes the resilient material to flow between protuberances 31 and firmly contact substantially the entire surface of pin 16 along the length of bushing 10. Thus, the bushing provides full surface contact with the relatively rotatable members in the assembled static condition. In addition, and of critical importance, the bushing provides firm, full frictional journal contact even under severe dynamic loading. When a load is applied to the vehicle the frame moves downwardly deflecting the supporting springs which in turn provide a correspondingly increased upward thrust. Relating this to the equalizer journal, the equalizer supporting pin 16 is forced downwardly against the upward thrust of the equalizer 15 compressing the bushing 10 therebetween, as shown in FIG. 5.

The passages 30 through baffle sleeve 25 permit the resilient material to flow plastically in response to the above described compression of the bushing 10 and retains the resilient material in firm contact with the top portion 32 of the journal bore 26 through equalizer 15. Prior art constructions, and particularly those of torselastic construction, permitted the resilient material to disengage along this top portion 32. Without the full surface frictional contact provided by the present invention, the prior art bushings would then slip against the relative rotatable members 15 and 16 and abrade, score or rupture the resilient material. A bushing 10 according to the present invention maintains the proper frictional contacts and flexes with the normal oscillation of the equalizer irrespective of the load.

There will, however, be occasions when the angular degree of oscillation of the equalizer 15 may exceed that which is normal. To prevent rupture of the resilient material on these oscillations, it has been found desirable to polish the surface of the supporting pin 16 or the interior surface of journal bore 26 to allow the bushing 10 to slip on the pin or turn in the equalizer 15 when the equalizer exceeds its normal angular degree of oscillation.

For a bushing 10 having an axial dimension of approximately 4" which is to be mounted on approximately a 2" diameter equalizer mounting pin it has been found that the best results are obtained by providing five circumferentially spaced bores at each of three locations along the longitudinal axis of the sleeve. In this disposition the upper two bores 30 are 90° on center, being 45° on either side of a vertical plane indicated by 33 through the longitudinal axis of the sleeve. The lower three bores 30 are 60° on center, with the vertical plane 33 including a diameter of the centermost of the lower bores. The bores are approximately ½" in diameter and are approximately 1" center to center longitudinally of the sleeve. From the description of this exemplary construction it is apparent that all the bores are of substantial section with respect to the sleeve itself because of the substantial diameter of the bores with respect to the circumference of the sleeve.

A bushing according to the present invention, therefore, provides a rigid core equalizer bushing which is easy to assemble into operative position in the journal and which maintains full frictional contact with both relatively rotatable members even under severe dynamic loading.

What is claimed is:

1. A resilient bushing adapted to be interposed in bearing relation between an oscillatable member and a relatively fixed supporting member comprising, an elongate cylinder of resilient material having a coaxial bore therethrough, a rigid cylindrical baffle sleeve embedded in said resilient cylinder so that a substantially uniform thickness of resilient material is bonded to the radially inner surface of said sleeve, the portion of said cylindrically-shaped resilient material radially outward of said sleeve being relieved adjacent the ends of said sleeve, circumferentially spaced passages through the medial portion of said sleeve at each of a plurality of longitudinal intervals along said sleeve, said passages having a substantial section with respect to said sleeve, and a resilient material bonded to the medial portion of said outer surface and communicating with the material bonded to the inner surface through said passages.

2. In combination with a suspension system for tandem axles supported on tandem leaf springs the adjacent ends of which are interconnected by an equalizer rotatable on a supporting pin, a resilient bushing interposed in bearing relation between said equalizer and said supporting pin, said bushing comprising, an elongate cylinder of resilient material having a coaxial bore therethrough, a rigid cylindrical baffle sleeve embedded in said resilient cylinder radially outwardly of said coaxial bore, and circumferentially spaced bores at each of a plurality of longitudinal intervals along said sleeve, the section of said bores being substantial with respect to the circumference of said sleeve, said resilient material adapted to flow plastically through said passages in response to pressure exerted on said bushing.

3. A resilient bushing adapted to be interposed in bearing relation between an oscillatable member and a relatively fixed supporting member, said bushing having a referential loading plane passing through the axis of said bushing, said bushing adapted to be inserted between said supporting member and said oscillatable members such that the static compressive forces therebetween act substantially along said referential plane on one side of the axis of said bushing, said bushing comprising an elongate cylinder of resilient material having a coaxial bore therethrough, a rigid cylindrical baffle sleeve embedded in said resilient cylinder radially outwardly of said coaxial bore, five circumferentially spaced bores located at each of three longitudinal intervals along said sleeve, the diameter of said bores being substantial with respect to the circumference of said sleeve, the centers of two of said bores lying approximately 45° on either side of the referential plane, the remaining said bores being approximately 60° on center with the middle bore of said three bores approximately centered on said referential plane on the opposite side of said axis from said first two bores and on that side of the axis of said bushing where said static compressive forces compress said resilient material.

4. In combination with a suspension system for tandem axles supported on tandem leaf springs the adjacent ends of which are interconnected by an equalizer rotatable on a supporting pin, a resilient bushing interposed in bearing relation between said equalizer and said supporting pin, said bushing comprising, an elongate cylinder of resilient material having a coaxial bore therethrough, a rigid cylindrical baffle sleeve embedded in said resilient cylinder radially outwardly of said coaxial bore, five circumferentially spaced bores at each of a plurality of longitudinal intervals along said sleeve, the diameter of said bores being substantial with respect to the circumference of said sleeve, said bushing having a referential loading plane passing through the axis of said bushing, said bushing being inserted between said suspending member and said oscillatable member such that the static compressive forces therebetween act substantially along said referential plane on one side of the axis of said bushing, the centers of two of said five bores being 45° on either side of the referential plane, the remaining three of said bores being approximately 60° on center with the middle bore of said three bores being centered on said referential plane on the opposite side of said axis from said first two bores and on that side of the axis of said bushing where said static compressive forces compress said resilient material.

References Cited in the file of this patent

UNITED STATES PATENTS

| | | |
|---|---|---|
| 1,697,066 | James | Jan. 1, 1929 |
| 1,872,580 | Harness et al. | Aug. 16, 1932 |
| 1,940,302 | Humphrey et al. | Dec. 19, 1933 |
| 1,993,260 | Burns | Mar. 5, 1935 |
| 2,051,864 | Knox et al. | Aug. 25, 1936 |
| 2,069,270 | Piron | Feb. 2, 1937 |
| 2,853,325 | Ward | Sept. 23, 1958 |

FOREIGN PATENTS

| | | |
|---|---|---|
| 532,393 | Great Britain | Jan. 23, 1941 |